Jan. 4, 1966     O. VON ZELEWSKY ET AL     3,226,909

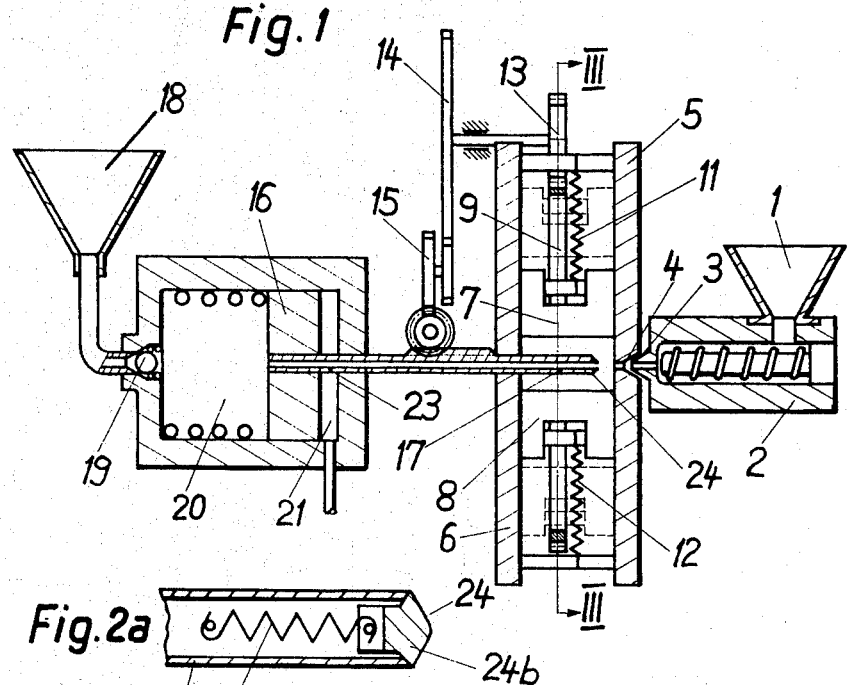
Fig. 1
Fig. 2a
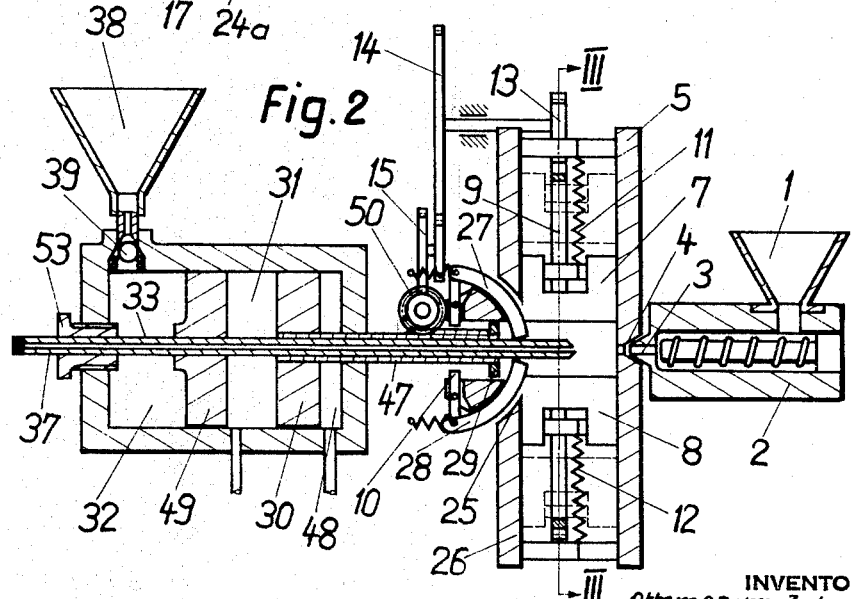
Fig. 2
INVENTORS:
Ottomar von Zelewsky
Werner Burkert
BY

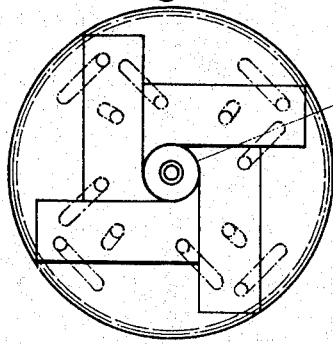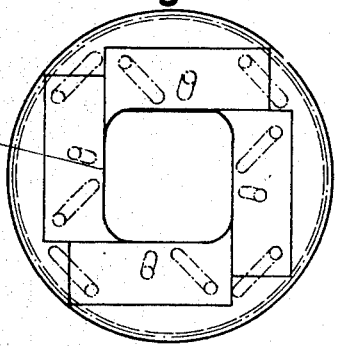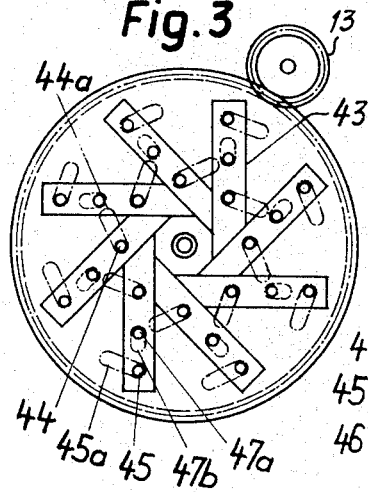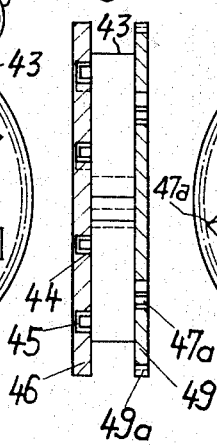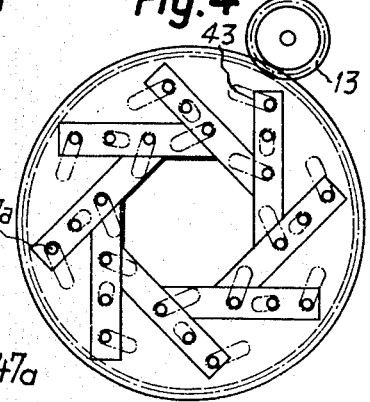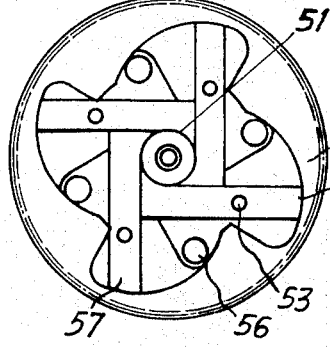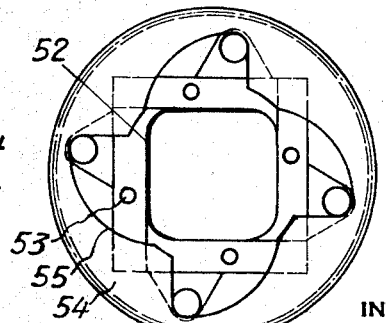

DEVICE FOR MAKING CONTAINERS OF SYNTHETIC MATERIALS

Filed July 23, 1962     3 Sheets-Sheet 3

INVENTORS
Ottomar von Zelewsky
Werner Burkert
BY

United States Patent Office 3,226,909
Patented Jan. 4, 1966

---

3,226,909
DEVICE FOR MAKING CONTAINERS OF SYNTHETIC MATERIALS
Ottomar von Zelewsky, Neuhausen am Rheinfall, and Werner Burkert, Schaffhausen, Switzerland, assignors to Georg Fischer Aktiengesellschaft, Schaffhausen, Switzerland
Filed July 23, 1962, Ser. No. 211,526
Claims priority, application Switzerland, July 26, 1961, 8,772/61
3 Claims. (Cl. 53—140)

The present invention relates to a method of and device for making containers of synthetic materials, especially containers for receiving gases and liquids. The heretofore known methods and injection machines for making containers of synthetic material produce in a first mold a small double-cone-shaped blank of synthetic material having embedded therein a filling needle. Thereupon, the lower portion of the mold is moved out. A second, greatly enlarged mold bottom section is moved in above the blank, the filling needle and the upper mold section. The blank will then, by means of the liquid to be filled into the container, be widened in the bottom mold section and inflated. The filling material consists of any type of fluid which is resistant only against pressure, for instance, injection solutions, cosmetic preparations, etc. However, with this method, the expansion of the container from one form to another form cannot be selected at random. For producing larger containers, it is, therefore, necessary to interpose a plurality of stages.

It is therefore an object of the present invention to simplify the heretofore known methods and devices employed for the purpose outlined above.

It is another object of this invention to provide a device for making containers of synthetic material, which will make it possible to use one and the same injection mold for the entire injection operation and for the widening of the workpiece.

These and other objects and advantages of the invention will appear more clearly from the following specification in connection with the accompanying drawings, in which:

FIGURE 1 is a longitudinal diagrammatic section through a first embodiment of an injection mold with injection unit along line II—II in FIG. 9 but showing parts of the machine not illustrated in FIG. 9.

FIGURE 2 represents a longitudinal section through another injection unit with injection mold in a representation similar to that in FIG. 1;

FIG. 2a is a detail of the filling needle of FIG. 1, shown in longitudinal section and drawn to an enlarged scale;

FIGURE 3 is a diagram of the first embodiment of an expandable injection mold in cross-section, said section being taken along the line III—III of FIGURE 2, and follows the principle of an iris diaphragm at its minimum opening;

FIG. 3a is an axial section of the mold shown in FIG. 3;

FIGURE 4 illustrates the same principle as FIGURE 3 but occupying its position of maximum opening;

FIGURE 5 illustrates a second embodiment of an expandable injection mold at minimum opening in cross-section;

FIGURE 6 shows the same embodiment of FIGURE 5 but with maximum opening in cross-section;

FIGURE 7 illustrates a further embodiment of an expandable injection mold with the same shutter elements in different arrangement at its minimum opening in cross-section;

FIGURE 8 shows the arrangement of FIGURE 7 with maximum opening in cross-section;

Figure 9:
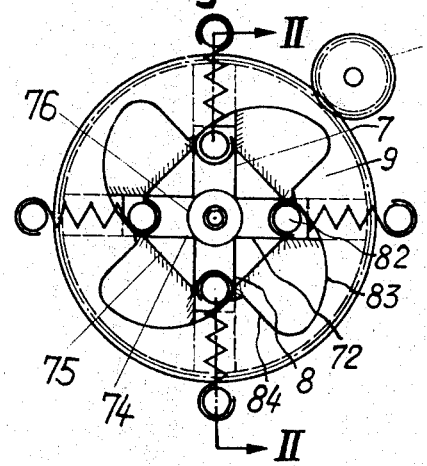
FIGURE 9 is a cross-section along line III—III of FIG. 1 at minimum opening.

The method according to the present invention is characterized primarily in that the chamber of the mold is, following the completion of the injection operation, widened by changing the position of the elements confining the mold chamber.

More specifically referring to the drawings and FIGS. 1 and 2 thereof in particular, the arrangement shown in FIGS. 1 and 2 comprises a hopper 1 for filling the synthetic material into an injection mold 2, for instance, a worm press with an injection nozzle 3. Actually, the injection nozzle is pressed into the fitting mouth 4 of the side wall 5 of the injection mold, at least for the duration of the respective injection operation.

According to FIG. 1, the two end walls of the injection mold are formed by the two plates 5 and 6, whereas the mantle contour is formed at least in part, by movable elements of which, in the longitudinal section of FIGS. 1 and 2, there are visible the two movable elements or side wall sections 7 and 8. The cam discs cooperating with said movable elements 7 and 8 are designated with the reference numerals 9 and 10, while the numerals 11 and 12 designate the corresponding return springs.

The actuation of the movable mantle elements 7 and 8 is effected, for instance, by a cam disc according to one of the FIGS. 3–10, which is actuated by the advance of the filling piston 16, and the filling needle 17 through the intervention of a gear transmission 13, 14, 15. It is, of course, to be understood that also other drives for the mantle elements 7 and 8, for instance, hydraulic drives, may be employed.

The filling medium for the containers is filled into the hopper 18 and through a check valve 19 passes into a cylinder 20, for instance, by movement of piston 16 toward the right (with regard to drawing). The filling substance consists, for instance, of milk, fruit juices, cosmetic preparations, coarse ground grain, washing ingredient-granules, which means of a material which is resistant only against pressure and which may also be termed fluids. Piston 16 has its back side 21 acted upon by a pressure fluid as, for instance, air, whereby piston 16 will be put into motion and will subject the filling medium to pressure. This filling medium passes through the hollow piston rod 23 into the filling needle 17 and will subject the container blank in the injection mold to an inner pressure. By successively opening the mantle walls—elements 7 and 8—of the injection mold, the container will, under the influence of the inner pressure, be widened and gradually assumes a definite shape corresponding to the fully opened position of the mantle elements 7 and 8. As will be seen from FIG. 2a the filling needle 17 has its tip provided with a small check valve 24, comprising a valve member 24b and a retaining spring 24a. Instead of the axial opening, one or more radial openings may be provided.

The embodiment of FIG. 2 differs from that of FIG. 1 with regard to the elements for introducing the filling medium and for the front face end closure of the injection mold. According to FIG. 2, the end face wall 26 has an opening 25 which may be closed by means of two calotte slides 27 and 28 controlled by control cams 29. The control cam 29 is arranged on a piston rod 47 and is actuated by a piston 30. The filling material passes from the hopper 38 through a check valve 39 into a cylinder 32 and from there through bores 33 into the hollow filling needle 37.

The chronological sequence of the method of injection in accordance with the teaching of the present invention may be set forth as follows:

(0) Starting position: Mold in closest position, filling needle in deepest position, filling medium drawn into cylinder 32, control cam 29 in its right-hand end position.

(1) Injection of the synthetic container material through mouth 4.

(2) Initiation of the blowing process.

Blowing in of a pressure medium, for instance air under pressure, into cylinder 48. As a result thereof, pistons 30, 49, piston rod 47 with control cam 29, and filling needle 37 will be moved toward the left. At the same time, cam disc 9, 10 is rotated by piston rod 47 through the intervention of transmission 50, 15, 14, 13, and the movable elements 7 and 8 of the form are opened. The abutment 53 limits the stroke of piston 49 whereby the conveyed quantity of the filling substance is metered out.

(3) Piston 30 moves further and through cam 29 actuates the slides 27, 28 which fuse or weld together the container material at the opening thereof after retraction of the filling needle 17.

(4) Opening of the mold and ejection of the completed container for instance by displacing mold walls.

(5) Closing mold.

Returning pistons 30 and 49 into starting position while simultaneously drawing filling medium into the cylinder chamber 32.

FIGS. 3 to 14 illustrate various embodiments of the expanding injection mold in cross section, said section being taken along the line III—III of FIGS. 1 and 2. FIG. 3 diagrammatically illustrates the structure for an expanding hollow chamber in conformity with the principle of an iris shutter, or of the polygon shutter slide. The expanding mold shown in detail in FIGS. 3, 3a and 4 comprises a circular guide disc 46 having in its one face grooves 44a and 45a engaged by pins 44 and 45, respectively, carried by a plurality of strips 43. The latter are held in contact with plate 46 by means of a cam disc 49 carrying a ring gear 49a. The latter meshes with gear 13 of transmission 13, 14, 15. The individual strips 43, which form side wall sections carry out a sliding movement in such a way that the corners of the polygon move radially. During this movement, the flanks always move parallel, and the enveloping members fully close off the space in each intermediate position.

FIGS. 5 and 6 illustrate a structure of tiltable plates or strips the front end of which has a foot with an inwardly directed quarter of a circular arc. At a minimum opening as shown in FIG. 5, four of such plates or strips confine a circle 41. In the position of maximum opening, a square 42 with rounded corners is obtained as shown in FIG. 6. Also with this embodiment, the cross section of the plates will in each position furnish an entirely closed confine with steadily merging portions. The plates are moved by relative rotation of the discs caused by transmission 13, 14, 15, 50.

Another mounting of the same plate is shown in FIGS. 7 and 8. The basic shapes of the mold chamber are the same as in FIGS. 5 and 6. The individual plates on side wall sections, however, carry out rotary movements about pivot points 53.

The two extreme positions are as follows:

(A) minimum volume—cross section 51 according to FIG. 7.

(B) maximum volume—square with rounded corners 52 according to FIG. 8.

In these positions, the enveloping elements show steadily merging portions without play as in FIGS. 5 and 6. However, in the intermediate positions, due to the rotary movements of the plates, a slight play will prevail between the plates at the pivot point 53 and the axes corresponding thereto. This small play, however, can hardly affect the supporting effect of the mold during the blowing operation.

The control of the rotary movement is conveyed to the rotary plates 57 through the intervention of a camdisc 54 by means of cam 55 and rollers 56. According to FIGS. 1 and 2, this cam disc designated with the reference numerals 9, 10 is driven by the transmission 13, 14, 15.

Also the embodiments with slide plates or side wall sections according to FIGS. 9 to 14 cannot fully enclose the hollow chamber formed in the intermediate positions of said plates in contrast to the situation prevailing at minimum and maximum opening.

These minimum and maximum openings, however, are the only important ones during the molding process. In the position of minimum volume, the movable slide plates 71, 72, 73, 74 according to FIG. 9 form the hollow chamber for the blank to be pressed, whereas in the maximum position according to FIG. 10, the movable slides 71, 72, 73, 74 in combination with the fixed walls 75 form the confining walls. In the intermediate stage, gaps are formed between the confining elements while the most important portions of the work piece being formed will remain supported.

Figure 10:
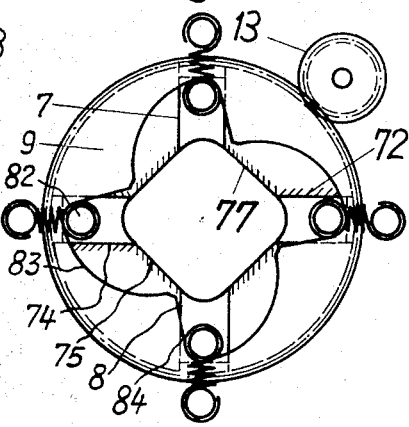
FIGURE 10 represents the arrangement of FIGURE 9 with maximum opening in cross-section.

According to FIG. 9, slides 71, 72, 73 and 74 form the minimum volume with a circular cross section 76, whereas the cross section of the maximum volume is represented by a square with rounded corners 77 as shown in FIG. 10. The four slides 71, 72, 73 and 74 are controlled simultaneously by a cam disc 81 and four rollers 82. The successively ascending cam arms 82 are employed for closing the mold. For purposes of opening the mold, the steep dropping branch 84 or the successively dropping system 83 may be employed, depending on the speed at which the injection operation is being carried out. In the first instance, the cam disc is continuously turned further, whereas in the second instance a mere oscillatory movement is required.

Figure 11:
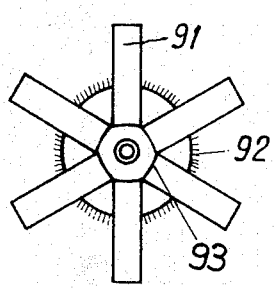
FIGURE 11 is still another embodiment of an expandable injection mold with slides with minimum opening in cross-section.
Figure 12:
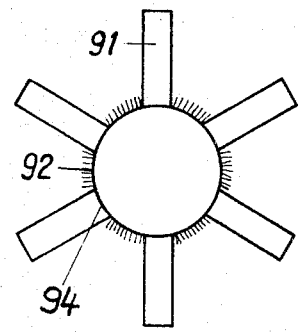
FIGURE 12 shows the arrangement of FIGURE 11 with maximum opening.

FIGURES 11 and 12 illustrate a star-shaped slide arrangement with six slides 91 in a fixed housing 92. FIG. 11 shows the position with minimum opening 93, whereas FIG. 12 illustrates the position with the maximum opening namely a circle 94.

Figure 13:
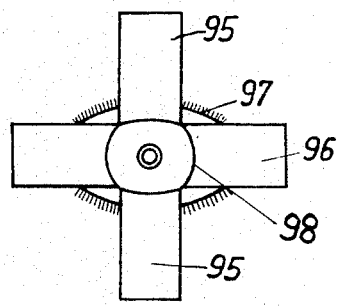
FIGURE 13 represents a further embodiment of an expandable injection mold with slides at minimum opening in cross-section.
Figure 14:
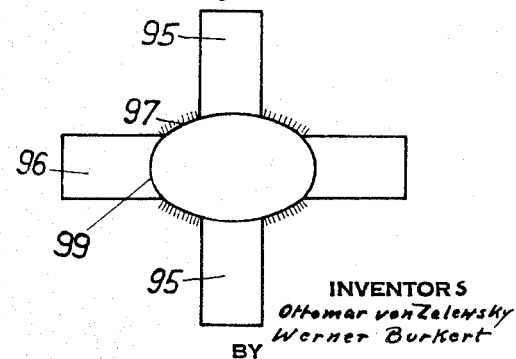
FIGURE 14 shows the embodiment of FIGURE 13 with maximum opening.

A corresponding design is shown in FIGURES 13 and 14 with two vertical slides 95 and two horizontal slides 96 in an oval housing 97. FIG. 13 illustrates the position of minimum opening which in cross section represents a four-cornered figure 98 composed of surplus segments. FIG. 14 shows the position of maximum opening having an oval cross section 99.

The great advantage inherent to the present invention is seen in that for the entire injection operation and for the widening of the blank, one and the same injection mold may be employed and no exchange of the mold will be required. With heretofore known containers which have rather limited dimensions (injection vials) at least two fixed injection molds of different size are required. For larger expansions, for instance to dimensions of food-preserving cans, probably inttermediate molds would become necessary. With the method and device according to the present invention, this expansion process can be carried out in one and the same injection mold.

A further advantage of the invention consists in that the wall of the injected blank is temporarily or permanently suported and cooled so that weak portions in the wall of the blank will be avoided.

It is, of course, to be understod that the present invention is, by no means, limited to the particular constructions shown in the drawings but also comprises any

What we claim is:

1. In an apparatus for the molding of containers of synthetic material filled with a substance to be stored therein, a mold including an expandible peripheral wall formed of a plurality of movable side wall sections movable from a contracted position forming a rigid mold of minimum volume for a blank for a container to an expanded position forming a larger rigid mold of maximum volume for a filled container, means for injecting material into said mold in the contracted position of said sections to form a blank, means for injecting a filling substance into said blank under pressure to expand said blank and means for concomitantly moving said sections to said expanded position to form a container filled with said substance.

2. In the apparatus defined in claim 1, means for sealing said filled container in said mold.

3. In an apparatus for the molding of containers of synthetic material filled with a substance stored therein, a mold including spaced end plates and an expandible peripheral wall between said end plates formed of a plurality of movable side wall sections movable from a contracted position forming a rigid mold of minimum volume for a blank for a container to an expanded position forming a larger rigid mold of maximum volume for a filled container, means extending through one of said end plates for injecting material into said mold in the contracted position of said sections to form a blank, means extending through one of said end plates into said blank for injecting a filling substance into said blank under pressure to expand said blank into a container, and means for moving said sections concomitantly to said expanded position, and means for removing said means for injecting said filling substance from said container and sealing said container in said mold.

References Cited by the Examiner
UNITED STATES PATENTS

| | | | |
|---|---|---|---|
| Re. 20,460 | 8/1931 | Jeffery. | |
| 2,205,837 | 6/1940 | Ravenscroft et al. | 53—20 |
| 2,577,412 | 12/1951 | Ferrell | 18—42 |
| 2,906,074 | 9/1959 | Binding | 53—20 X |
| 3,029,468 | 4/1962 | Valyi | 18—42 X |
| 3,097,398 | 7/1963 | Inglesby | 18—42 |

FRANK E. BAILEY, *Primary Examiner.*

TRAVIS S. McGEHEE, *Examiner.*